United States Patent [19]
Thillays

[11] 3,845,318
[45] Oct. 29, 1974

[54] PHOTOCOUPLING DEVICE HAVING THE TRANSMITTER AND RECEIVER MOUNTED ON OPPOSING EDGES OF ALIGNED LUGS

[75] Inventor: Jacques Claude Thillays, Herouville-St-Clair, France

[73] Assignee: U.S. Philips Corporation, New York, N.Y.

[22] Filed: Jan. 18, 1974

[21] Appl. No.: 434,493

Related U.S. Application Data

[63] Continuation of Ser. No. 296,267, Oct. 10, 1972, abandoned.

[30] Foreign Application Priority Data

Oct. 8, 1971 France ............................ 71.36317

[52] U.S. Cl. .................. 250/551, 250/552, 357/72, 357/19

[51] Int. Cl. ........................................ H01j 39/12

[58] Field of Search .................. 250/551, 552, 553; 317/234 E, 235 N, 235 F

[56] References Cited

UNITED STATES PATENTS

| | | | |
|---|---|---|---|
| 3,480,783 | 11/1969 | Mankarious | 250/551 |
| 3,639,770 | 2/1972 | Zizelman | 317/234 E |
| 3,660,669 | 5/1972 | Grenon | 250/551 |
| 3,739,241 | 6/1973 | Thillays | 317/235 N |

*Primary Examiner*—Harold A. Dixon
*Attorney, Agent, or Firm*—Frank R. Trifari

[57] ABSTRACT

A photocoupling device comprising a phototransmitter and a photosensitive receiver which are arranged opposite to each other on connection lugs which during manufacture may form part of metal combs. The device is characterized in that the transmitter and the receiver are each mounted on side surfaces of the lugs to facilitate optical alignment of the device.

4 Claims, 2 Drawing Figures

Figure 1:
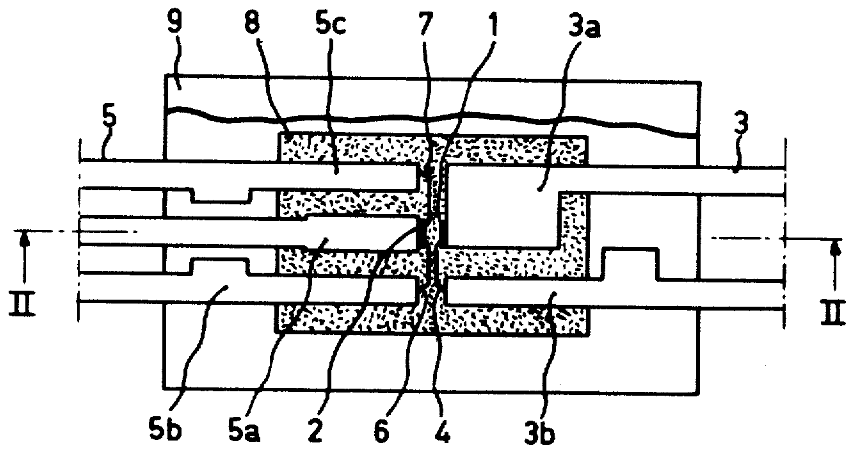

PHOTOCOUPLING DEVICE HAVING THE TRANSMITTER AND RECEIVER MOUNTED ON OPPOSING EDGES OF ALIGNED LUGS

This is a continuation, division, of application Ser. No. 296,267 , filed Oct. 10, 1972, now abandoned.

The invention relates to a photocoupling device which comprises a semiconductor phototransmitter and a semiconductor photosensitive receiver which are arranged opposite to each other, are coupled together optically and mechanically and are each soldered to a metal lug, said lugs being cut from a band comprising several equal supports placed in a row.

There exist several optoelectronic combinations having a transmitter and a receiver which are coupled together optically to transmit an electric signal, via a light signal, from a first circuit to a second circuit which is insulated entirely from the first. Said combinations which are termed photocouplers usually comprise an electroluminescent diode as a transmitter and a photodiode, a phototransistor or a photoresistor as a receiver, said transmitter and receiver generally being semiconductor devices.

It is known that, in order to have the correct properties, a photocoupler must satisfy a given number of geometric, electric, thermal and economic requirements. From a geometrical point of view, the transmitter and the receiver must be arranged on the same optical axis, so that the transmitting cone of the source coincides with the receiving cone of the receiver which are determined by the surface areas of the photoemissive and photosensitive junctions. From an electric point of view it is necessary to determine an optimum distance between the transmitter and the receiver, because said distance simultaneously influences the value of the insulation, the value of the energy transfer as well as the value of the stray coupling capacity. As regards the stray coupling capacity, it is possible to reduce said capacity by reducing the surface area of the said transmitter and receiver. On the other hand, the transmitter and the receiver must be provided on cooling members to dissipate the developed energy. These two cooling members must be insulated from each other electrically.

From the economic point of view, finally, the raw materials and the cost of labour must be thoroughly studied to achieve the best manufacturing output since the photocoupler is a complicated device the performances of which can be determined only after the last assembly treatment.

From the mechanical point of view there exist two assembly methods of photocouplers. According to the first method, two devices, namely a transmitter and a receiver, are arranged opposite to each other; these two devices have the same geometries and are each enclosed in an envalope, the connection being ensured by a light ray conductor, the assembly being then embedded in a thermosetting synthetic resin. According to the second method, two crystals or two sets of crystals are arranged opposite to each other and are connected together by a transparent cement, the resulting device being then placed in a water-tight metal envelope. The cement usually consists of a lacquer having a high index of refraction which for that purpose contains additions of arsenic trisulphide ($As_2S_3$) and arsenic pentaselenide ($As_2Se_5$).

In the two methods described, the transmitter and the receiver must be arranged opposite to each other. Taking into account the mechanical elements which are used so far, this method constitutes a very difficult and rather inaccurate positioning treatment as a result of which comparatively small production outputs are achieved. In addition, the transfer efficiency which depends to a great extent upon the distance between the transmitting plane and the receiving plane and upon the parallelism of the said planes shows great differences between the devices mutually, said distance being determined only to an approximation.

The invention avoids these drawbacks and provides efficacious optical coupling devices which can be manufactured by means of a simple mounting method.

The invention uses combs which are known in semiconductor mechanization and have a number of lugs supported by a metal band.

According to the invention, the photocoupler device mentioned in the preamble is characterized in that the said transmitter and receiver are each mounted on an edge surface of adjacent metal lugs.

The metal bands which comprise the supports are placed in a row and are advantageously flat with the thickness of said bands substantially equal to the width of the crystals comprising the phototransmitter and receiver.

Such a device presents many advantages: it very readily satisfies the various requirements which are imposed upon a photocoupling device. From the optical point of view, the provision of the transmitter and the receiver on the same optical axis is quite facilitated because the width of the crystals corresponds to the thickness of the lug of the comb and because, since the combs are manufactured from flat bands, they can be positioned from one reference plane. From the electric point of view, the distance between the transmitter and the receiver may easily be chosen optimum by continuously checking the most important properties of the photocoupler during building-in its various elements. In this manner such a distance is obtained that the target plane of the transmitting cone is substantially equal to the plane of the photo-sensitive junction, said distance being determined so that the value of the insulation voltage is high and the stray coupling capacity is small.

From the thermal point of view, the connection lugs constitute very good cooling members due to their large cross section. Finally, the cost is considerably reduced because many elements can be handled simultaneously since they can be physically coupled during manufacture via the combs, and because conventional construction techniques are used.

A type of photocoupling device is already known which comprises lugs or metal combs. With this photocoupling device, however, the transmitting crystal and the receiving crystal are soldered on one of the faces of the metal lug, said lug being previously curved so that a transmitter and a receiver can be placed opposite to each other. In this case the transmitting crystal and the receiving crystal during assembly are masked by the lugs serving as supports, in which their positioning becomes inaccurate, inter alia as regards the centring and the parallelism. The curvature of the lugs means an extra treatment which influences the price of the assembly.

According to a preferred embodiment of the invention, the transmitter and the receiver are covered by a transparent member with which they form one assembly and which serves as an adaptor of the index of refraction, said transparent member being embedded in an opaque member.

The transparent and the opaque member are preferably manufactured from thermosetting synthetic resins having substantially the same properties, as a result of which the deformation by, inter alia, temperature variations can be avoided.

Figure 2:
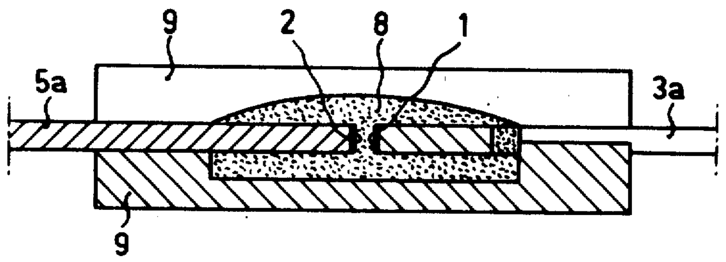

The invention will be described in greater detail with reference to the Figures, in which FIG. 1 is a plan view of a device according to the invention, FIG. 2 is a diagrammatic sectional view of the said device taken on the line II-II of FIG. 1.

It is to be noted that for clarity the dimensions in the Figures are exaggerated and not in proportion.

The device shown in FIGS. 1 and 2 comprises on the one hand a phototransmitter 1, for example, an electroluminescent diode manufactured from a gallium arsenide single crystal, which diode comprises two regions of opposite conductivity types, and on the other hand a photosensitive receiver 2, manufactured from a silicon crystal, in the present case a phototransistor. One of the two regions of the transmitter 1 is soldered on the side of a first connection lug *3a* of a support 3, the second lug *3b* of which is connected electrically to the second region of the said transmitter 1 via a wire 4.

The photosensitive receiver 2 is soldered to the side of a connection lug *5a* of a support 5 by means of its collector, the other lugs *5b* and *5c* of which are connected electrically to the base and emitter of the photosensitive receiver 2, via the wires 6 and 7.

The transmitter 1 and the photosensitive receiver 2 which are secured to their respective supports 3 and 5 which form part of comb-shaped bands are placed opposite to each other and are embedded in a single transparent layer 8 of a member which is to serve as an adaptor for the index of refraction, for example, one of the transparent synthetic resins which are known in trade as EPOTEK 301 and RHODORSIL RTV 151. The assembly thus manufactured is embedded in an opaque epoxy layer 9 which usually is in the form of a parallelepiped.

The soldering of the crystals to the side of the connection lugs and the arrangement opposite to each other prior to embedding is carried out exclusively by means of conventional technological means, which is an important advantage. The arrangement opposite to each other of the transmitting crystal and the receiving crystal can occur very accurately as a result of which photocoupling devices having a high transfer efficiency can be obtained.

The thermal dissipation of the crystals occurs via the connection lugs which for that purpose have comparatively large dimensions in which their thickness must be substantially equal to the width of the said crystals.

What is claimed is:

1. A photocoupler device, comprising:

first and second spaced lugs having respectively first and second flat major surfaces lying in the same plane and having respectively first and second flat side surfaces perpendicular to said plane and oriented substantially parallel to and at least in part facing each other;

a semiconductor phototransmitter having two flat substantially parallel major surfaces, one major surface of which may be caused to emit electromagnetic energy and the other major surface of which is mounted on and supported thereby parallel to said first side surface for transmitting light energy toward said second side surface;

a semiconductor photosensitive receiver having two flat substantially parallel major surfaces, one major surface of which is sensitive to said light energy and the other major surface of which is mounted on and supported thereby parallel to said second side surface in optical alignment with said phototransmitter for receiving light energy from said phototransmitter; and light transparent supportive material encapsulating said phototransmitter, photosensitive receiver and a portion of each of said lugs mounted thereto.

2. A photocoupler device as defined in claim 1 wherein the width of said phototransmitter is approximately equal to the thickness of said first lug, and the width of said photosensitive receiver is approximately equal to the thickness of said second lug to facilitate accurately mounting said phototransistor and photosensitive receiver on said lugs to make optical alignment dependent only upon the relative position of said lugs.

3. A photocoupler device as defined in claim 2 wherein the thickness of both lugs is the same to facilitate the relative positioning of said lugs.

4. A photocoupler device as defined in claim 3 wherein said phototransmitter and photosensitive receiver are respectively mounted adjacent edges oriented in the direction of thickness of said first and second lugs respectively to further facilitate accurately mounting said phototransmitter and photosensitive receiver on said lugs.

* * * * *